No. 864,907. PATENTED SEPT. 3, 1907.
J. G. MURBACK.
SAW JOINTER.
APPLICATION FILED MAY 31, 1907.

Witnesses:  Inventor
  J. G. Murback
By his Attorney
Edward N. Pagelsen.

UNITED STATES PATENT OFFICE.

JOHN G. MURBACK, OF CATHLAMET, WASHINGTON.

SAW-JOINTER.

No. 864,907.　　　　Specification of Letters Patent.　　　　Patented Sept. 3, 1907.

Application filed May 31, 1907. Serial No. 376,512.

*To all whom it may concern:*

Be it known that I, JOHN G. MURBACK, a citizen of the United States, residing at Cathlamet, in the county of Wahkiakum and State of Washington, have invented a new and Improved Saw-Jointer, of which the following is a specification.

After saws have been in use for some time, their teeth become of unequal length, either because of unskilful filing or because some of the teeth are slightly harder than others. The cutting value of the saw is thereby diminished.

My improved saw jointer is adapted to hold a file or other cutting tool in such a manner that the ends of the teeth can all be made true, when they can be properly sharpened.

My invention consists in a novel frame having adjustable guides to contact with the saw, and means to grip the cutting tool.

It also consists in a novel frame having a guide to determine the height of the drag teeth of the saw.

Figures 1, 2:
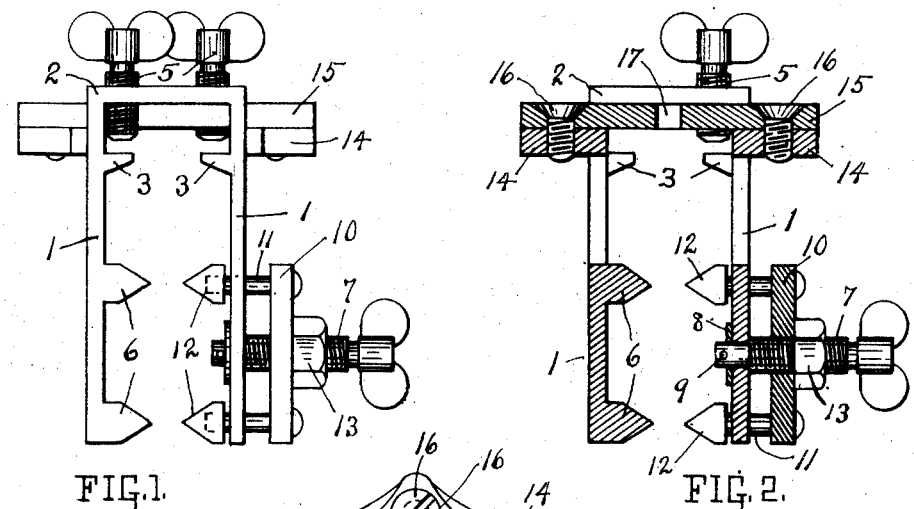
Figure 3:
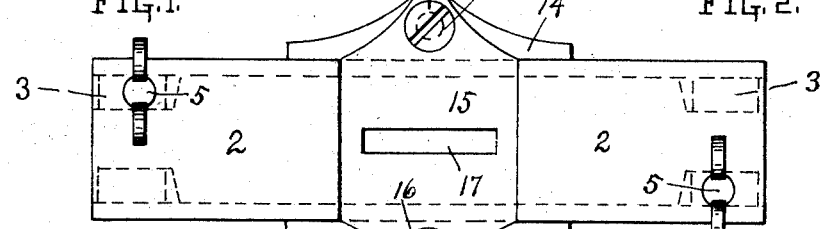
Figure 4:
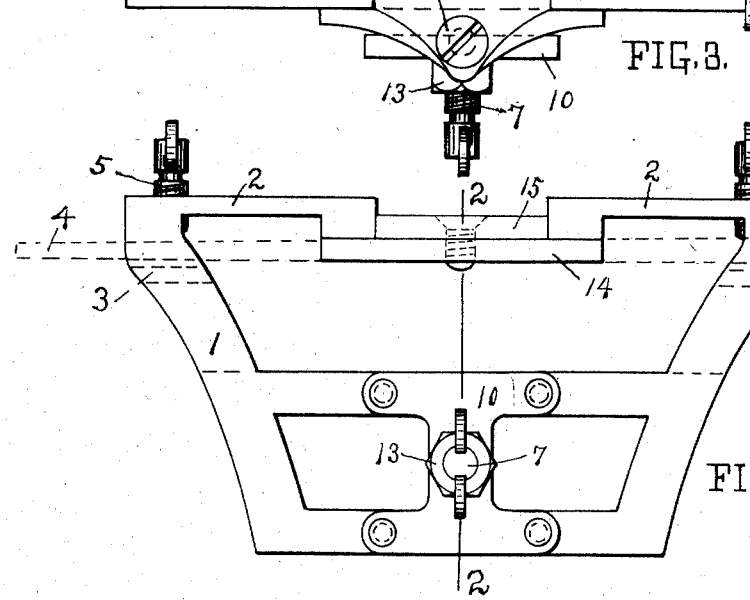

In the accompanying drawing, Figure 1 is an end view of my improved device. Fig. 2 is a cross section on the line 2—2 of Fig. 4. Fig. 3 is a plan and Fig. 4 is a side view of the device.

Similar reference characters refer to like parts throughout the several views.

This device consists of a guide, a tool holder and a gage for the height of drag teeth, all combined in one frame. The frame consists of parallel sides 1 and top pieces 2 connecting the same. Projecting lugs 3 on the sides are adapted to hold the file 4 or other cutting tool, the thumb screws 5 being provided for holding the file in place. As the tops of the lugs 3 are in a plane at right angles to the sides, the bottom of the file will always be at right angles to the saw being jointed. The frame may be of brass, iron or other desirable material.

To hold the sides of the frame parallel to the saw, I provide the guides 6, formed on one of the sides 1, and having bearing edges parallel to the sides. A thumb screw 7 is journaled in the side opposite the guides 6, being held in position by the washer 8 and pin 9. A plate 10 is screw-threaded to fit the screw 7 and carries the pins 11 which are slidable in the side. The shoes 12 on the ends of the pins 11 are adapted to contact with the saw. A nut 13 is used to lock the thumb screw 7.

The nut is loosed and the shoes 12 adjusted to contact lightly with the saw, so the frame may be moved along the saw with the file sliding on the points of the saw teeth, until all the points have been cut down to the same height.

Spaced at intervals among the teeth of saws are drag teeth, which should be somewhat shorter than the cutting teeth and are intended to drag the saw-dust out of the cut. The notches next the drag teeth are usually very large and deep.

The top pieces 2 of the frame are separated by a gap, and are connected by the cross bars 14. Resting on these cross bars in the gap is a plate 15, held in place by the screws 16, and provided with a slot 17. This plate 15 can be raised to any desired height by placing thin strips between it and the cross bars 14. When the height of the drag teeth is to be diminished, the file is removed and the frames so placed on the saw so that the drag teeth project through the slot 17, when they may be filed off.

Having now explained my improvements, what I claim as my invention and desire to secure by Letters Patent is—

In a saw jointer, the combination of a frame comprising a top and two sides, an adjustable guide plate outside of one of the sides, a screw mounted in said side and adapted to position the guide plate, and guide pins carried by said plate and extending through said side and adapted to contact with the saw, to position the jointer.

In testimony whereof I have signed this specification in the presence of two subscribing witnesses.

JOHN G. MURBACK.

Witnesses:
　BRUCE POLWARTH,
　A. PEARSON.